Aug. 31, 1937. G. E. HITZ 2,091,544
METHOD OF STOPPING AND REPAIRING LEAKS IN GAS MAINS
Filed May 9, 1936
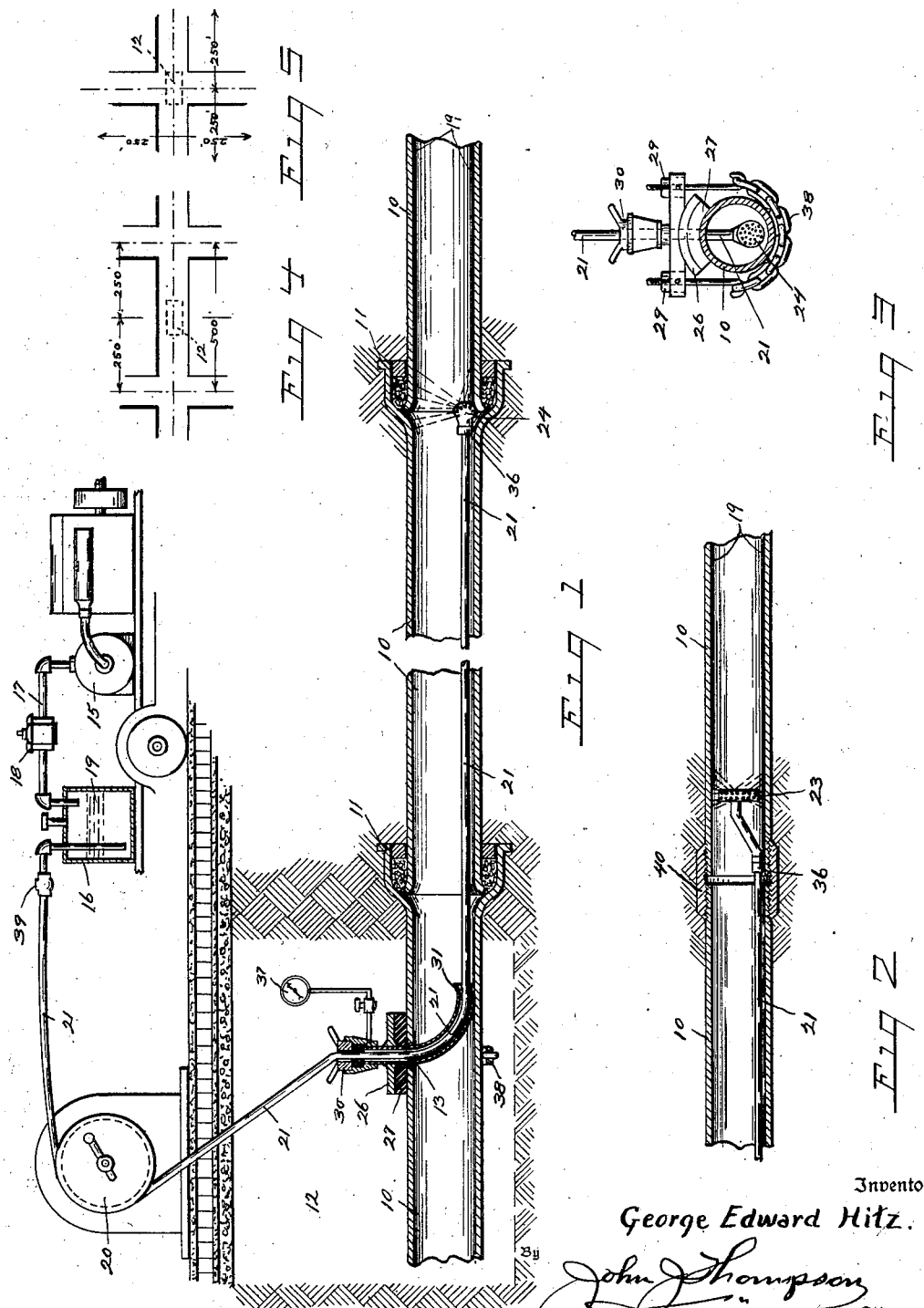
Inventor
George Edward Hitz.
John J Thompson
Attorney Patented Aug. 31, 1937

2,091,544

UNITED STATES PATENT OFFICE 2,091,544

METHOD OF STOPPING AND REPAIRING LEAKS IN GAS MAINS

George E. Hitz, Poughkeepsie, N. Y.

Application May 9, 1936, Serial No. 78,945

1 Claim. (Cl. 48—194)

The principal object of the present invention is to provide a method for repairing gas leakage in gas mains, pipes, or conduits which are used for the transmission and distribution of fuel or other gases.

Another object of the invention is the leak proofing of cast iron bell and spigot fibrous packed joints in gas mains or the like, especially above 10 inches in diameter which is the practical limit of treating such joints by the "capillary climb method" now in use.

Still another object of the invention is the leak proofing of bell and spigot type joints in all diameters, containing fibrous packing which has been previously treated with soap, and known as "soaped yarn", or so saturated with gum or other foreign residue as to prevent treatment by the capillary climb method. Reference is made to my copending application Ser. No. 674,699, Method of sealing pipe lines, filed June 7, 1933.

These and other objects will become evident from the following specification, taken together with the accompanying drawing, in which, Figure 1 is a horizontal cross section of a typical gas main of the cast iron bell and spigot type, and illustrating the method of introducing the necessary apparatus into the gas main while in operation and under gas pressure for the purpose of treating, as well as the other auxiliary apparatus employed.

Figure 2 is a horizontal cross section of a length of pipe showing the method of coating the internal surface with a liquid or plastic leak proofing material.

Figure 3 is a cross sectional view of the gas main at the tapped hole showing the admission tube assembly secured in place.

Figure 4 is a diagrammatic view of a street showing a gas main, and the approximate location of the excavation through which the main is treated in the different directions indicated.

Figure 5 is a diagrammatic view showing a street intersection and indicating the gas mains.

Gas transmission and distributing systems usually consist of cast iron, wrought iron, or steel pipes laid underground. After years of service, the cast iron bell and spigot, packed joints usually leak as a result of temperature changes affecting the metallic or cement portion of the joint through expansion and contraction of the pipe, or due to the drying out of the fibrous packing in the back of the joint, resulting from the distribution of dry or partially saturated gas or to other physical causes. In the case of threaded or welded steel or wrought iron gas mains, leakage results from defective couplings or joints, or from internal corrosion due to contact with the oxidizing elements in the gas distributed or to corrosive elements in the soil in which the pipe is laid.

In recent years, a method has been developed in which the joints of cast iron bell and spigot pipe are treated by admitting a special non-drying liquid to the gas main at an elevated point and allowing the liquid to flow by gravity across the main joints to a low point or so-called "drip" where the excess liquid, not absorbed, is removed. In this process, the liquid flowing past the joint, contacts with the fibrous packing and, through capillary attraction, rises to the top of the joints, sealing the packing and leak proofing the joint.

While this method is entirely successful in the case of mains of small diameter, the length of time required to leak proof joints over 10 inches in diameter make such treatments impractical and uneconomical. On the other hand, the specially prepared packing known to the trade as "soaped yarn" cannot be treated with the gravity method for the reason that little or no capillary climb can be induced in this packing.

I have therefore, devised a method for the application of leak proofing to all joints, especially in the larger sizes, and all joints containing "soaped yarns". The direct contact pressure method covered in this specification, makes possible the complete and successful leak proofing of any size of pipe or joint, or any kind of fibrous packing. Another field of application is in the leak proofing of steel or wrought iron gas pipes or conduits deteriorated by internal and/or external corrosion, by coating the internal surface with a fluid, plastic, or semi-plastic material.

This material may be asphaltic, latex or rubber, or other compounds which are impervious to the action of the gas transmitted. I have also found that a mixture of about 53% glycerine, 33% diethylene glycol and 14% methyl alcohol produces a protective coating, brown in color, on cast iron gas mains treated with this compound.

Liquids suitable for spraying in the joints of cast iron mains, may be those of the alcohol group consisting of the monohydroxy, dihydroxy, or polyhydroxy alcohols. Examples of these liquids would be octyl, lauryl or cetyl alcohol, diethylene glycol, and glycerine either as unitary liquids or in compounds of several liquids. Other liquids will develop from time to time having principally the characteristics of low vapor pressure and non-volatile, high boiling point and be physically and chemically inert to the gas transmitted. Still other liquids which will saponify or become plastic or semi-plastic may be used. Oleic acid alone and in combination with some of the above liquids has been used for this purpose.

The coating of the inside of the main prevents further corrosion and seals any small leaks which may have developed in the pipe or joints.

In the herein described process, I have shown three uses of the process, others may develop from time to time. They include:

(1) A means of introducing the leak proofing material under the operating gas pressure prevailing, and (2) A means of treating the joints with a specification liquid to leak proof the fibrous packing, and (3) A means of coating the internal surface of the pipe or conduit to render it leak proof and protect it from further corrosion.

During several years' experience in the treatment of cast iron bell and spigot gas main joints, by flowing a specification liquid from an elevated point across the joints to a low point, a saturation of the packing through capillary climb has been proven. The results show that the practical limitation of this method is that joints over 10 inches in size require so many separate runs or treatments that it is uneconomical and requires too much time to afford a prompt relief from the leakage condition. For instance, in the ten and twelve inch sizes, seven to eleven treatments are required over a period of six months.

From this schedule it is seen that the treatments must be followed for long periods to secure efficient results. Furthermore, the large sized mains, above ten inches in diameter cannot be properly or completely treated by the gravity and capillary method. It has also been found that the so-called "soaped yarns" used to some extent in past years in bell and spigot gas main joints cannot be treated at all by this method.

I have succeeded in developing an apparatus and method which overcome the deficiencies of the gravity-capillary climb method of treating bell and spigot joints, regardless of the size of the joint or the type of fibrous packing used in its construction. I find that sections of main 250 feet long can easily be treated in one direction from a single point, which results in the possibility of treating 500 feet from one excavation between intersecting streets, as shown in Fig. 5. There is no reason why longer sections of main should not be treated from one point, the above distances being recorded from actual tests in which the equipment was limited to the lengths given. In one case involving 10,560 lineal feet of ten-inch ball and spigot main, with "soaped yarn" joints, this method required only 26 pavement excavations as compared to 1,000 excavations if bell joint clamps had been placed, which was the only remaining satisfactory method of correcting the leakage.

In the actual practice of my process, I have used liquids in rates varying from ½ to 1 gallon per minute on ten inch pipe, but this rate will vary with the size of main treated to secure complete saturation of the packing. If desired, the tubing 21 can be marked at twelve foot intervals and the liquid sprayed only at the joints. Where a special plastic or semi-plastic is used to coat the entire inner surface, a continuous spray over the section to be treated would be made.

When liquids are used which result in an excess over that required to coat the main and treat the joints, the residual is removed at the lowest main elevation below the treated section where a "drip" is usually installed.

While I have here shown and described a suitable combination of parts for carrying out the steps of my process, I do not confine myself to the exact apparatus shown as others suitable for this purpose may be employed.

In Fig. 1 of the drawing, I have indicated a street through which a gas main 10 has been laid under ground and which has the conventional bell joints 11 which are packed in the usual manner.

Midway between two street intersections, as shown in Fig. 4, or at said intersections, as shown in Fig. 5, an excavation 12 is made uncovering a portion of the gas main 10, and a tapped hole 13 is formed in said gas main 10 with the usual tapping machine or otherwise.

Upon the street pavement adjacent to the excavation 12 I have indicated an air compressor 15, a fluid container 16 connected to the air compressor 15 by a pipe 17 controlled by a pressure governor 18. The container 16 holding the liquid or coating compound 19 is provided with a flexible tube 21 which is carried around the reel 20, and to the end of which is secured a coupling 36, to this coupling 36 may be interchangeably secured either the compound applicator 23 or the spray nozzle 24 as may be required.

The liquid meter 39 installed on the outlet of the container 16 is used to determine the rate of liquid input.

In Fig. 1, I have shown the apparatus assembled for the purpose of treating a section of the gas main 10 for possible leakage, which is done as follows, assuming a two-way flow of gas.

A special assembly 26 is inserted in the tapped hole 13 and is provided with a rubber gasket 27, a chain pipe clamp 28 extending around the pipe 10 and secured by an adjusting screw 29 in the usual manner similar to that employed by the tapping machine. This assembly 26 is provided with a stuffing box 30 and a pilot tube 31 which extends downward within the gas main 10 with its discharge end parallel to the bottom of the gas main 10. Within this pilot tube 31 is slidably mounted a flexible tube 21 from the reel 20 and upon the end of the said flexible tube 21 is secured a nozzle 24 or applicator 23.

This flexible tube 21 is pushed through the pilot tube 31 and through the gas main 10 for the required distance, shown here as approximately 250 feet, although greater distances may be treated, the stuffing box 30 providing a gas-tight joint between the pilot tube 31 and the flexible tube 21.

The compressor 15 is now started, forcing compressed air into the tank or container 16, displacing the fluid therein which flows through the liquid meter 39, the flexible tube 21 and is discharged through the spray nozzle 24 in the form of a spray which completely coats the inner surface of both the gas main 10 and the joints 11, and which is equally applicable to gas mains of ten inches and over as well as the smaller diameters.

As the liquid is being sprayed, the flexible tube 21 is withdrawn from the assembly 26 to impart to the nozzle 24 a predetermined rate of travel through the gas main 10 thus coating the interior thereof.

This operation is repeated through the tapped hole 13 in the opposite direction to coat the gas main an equal distance in the said opposite direction. As indicated in Fig. 5, this operation may be performed four ways from an excavation at the intersection of two streets, treating a half block or more in each direction.

If it is desired to treat the inner surface of the gas main 10 and the joints 11 or 40 with a plastic or semi-plastic compound rather than the spray liquid, a special applicator 23 is provided on the end of the connection 36 secured to the end of the flexible tube 21. This is employed to bring the discharge opening of the nozzle or applicator in closer proximity to the inner surface of the pipe, this nozzle is inserted through the gas main 10 in the same manner as the spray nozzle 24, and is also drawn back during the act of spraying or coating.

Having thus described my invention, what I claim is new and desire to secure by Letters Patent, is:

The herein described method of closing and preventing leaks in gas mains and their joints without interrupting the flow of gas in the mains which consists in introducing liquid sealing compound to the inner surface of the mains and joints in the form of a spray from a source within the mains and at the same time moving said source through the mains during the treatment.

GEORGE E. HITZ.